United States Patent [19]

Kunugi et al.

[11] Patent Number: 5,296,266
[45] Date of Patent: Mar. 22, 1994

[54] METHOD OF PREPARING MICROCAPSULE

[75] Inventors: Masanao Kunugi; Hiroshi Itoh; Hajime Kurihara, all of Suwa, Japan

[73] Assignee: Seiko Epson Corporation, Tokyo, Japan

[21] Appl. No.: 657,568

[22] Filed: Feb. 19, 1991

[30] Foreign Application Priority Data

| Feb. 22, 1990 [JP] | Japan | 2-41956 |
| Sep. 11, 1990 [JP] | Japan | 2-240593 |
| Jan. 17, 1991 [JP] | Japan | 3-003815 |

[51] Int. Cl.$^5$ .......................... B01J 13/12; G03G 9/08
[52] U.S. Cl. .................. 427/213.36; 427/213.3; 264/4.6; 264/4.1; 430/138
[58] Field of Search ............ 264/4.1, 4.6, 4; 427/213.3, 213.36, 212, 213; 430/138

[56] References Cited

U.S. PATENT DOCUMENTS

| 3,196,032 | 7/1965 | Seymour | 430/137 |
| 4,016,099 | 4/1977 | Wellman et al. | 264/4 X |
| 4,286,037 | 8/1981 | Hectors et al. | 430/137 X |
| 4,859,560 | 8/1989 | Nakamura et al. | 430/137 |
| 4,900,647 | 2/1990 | Hikake et al. | 430/137 |
| 5,017,383 | 5/1991 | Ozawa et al. | 427/212 X |

FOREIGN PATENT DOCUMENTS

| 266175 | 5/1988 | European Pat. Off. | 430/138 |
| 362859 | 4/1990 | European Pat. Off. | 430/138 |
| 2134518 | 12/1972 | France . | |
| 1-021460 | 1/1989 | Japan | 430/138 |
| 1331573 | 9/1973 | United Kingdom . | |

*Primary Examiner*—Robert L. Stoll
*Assistant Examiner*—John M. Covert
*Attorney, Agent, or Firm*—Ladas & Parry

[57] ABSTRACT

A method for producing microcapsules in which various coats can be applied to various cores at any desired but uniformly controllable thickness comprises the steps of:

(a) providing microcapsule cores,
(b) depositing resin particles uniformly onto the surfaces of the microcapsule cores to form resin particle-deposited-onto-cores,
(c) putting the resin particle-deposited-onto-cores in a monodisperse state,
(d) bringing the resin particle-deposited-onto-cores in the monodisperse state into contact with a solvent in which the resin of the resin particles can dissolve, and
(e) drying the resin particle-deposited-onto-cores which has been brought into contact with the solvent, while kept in the monodisperse state and, then, recovering the dried cores.

12 Claims, 5 Drawing Sheets

METHOD OF PREPARING MICROCAPSULE

BACKGROUND OF THE INVENTION

1. Field of the Invention

The present invention relates to a method of preparing microcapsules and, more specifically, to a method of preparing toners of a multilayered structure.

2. Description of the Related Art

In numerous technical fields, attention is now being paid to using microcapsules as functional particles.

For instance, imaging toners are required to serve high-performance functions. Thus various techniques for producing microcapsules of a multilayered structure have been proposed to this end, including, e.g. methods for producing microcapsule toners by polymerization with a view to fixing them with low energy (U.S. Pat. No. 3,080,250, Japanese Patent Publication No. 31066/1984 and Japanese Patent Publication No. 36934/1989); a method for producing toners having electrification-controlling resin films around them using a dry high speed impact technique with electrification control in mind (Japanese Patent Laid-Open Publication No. 62666/1988); and a method for producing toners by treating their surfaces with finely divided resin powders for the purpose of imparting blocking resistance to them (Japanese Patent Laid-Open Publication No. 105261/1989).

Problems with the toners obtained by fixing coats to them with the aid of a high speed impinge or impact force (Japanese Patent Laid-Open Publication Nos. 62666/1988 and 105261/1989), however, are that the coats are so much less adhesive to the toner surfaces and undergo such large variations in thickness or adhesion that they degrade during use, separating off the toner surfaces or undergoing changes in their surface shapes, etc., thus resulting in a drop of the quality of the resulting images. The microcapsule-coating methods (Japanese Patent Nos. 310666/1984 and 61141/1987) also involve similar problems or offer difficulties in connection with toners' durability and coagulation stability due to the coats being thin and varying largely in thickness or for other reasons.

In most of the conventional methods, the toners' cores and coats must stand up to the heat or pressure which are used to deposit and fix the coats to the toners' cores. For that reason, there is another problem that some limitation is placed on the materials of which the toners' cores and coats are made.

Generally speaking, it is thus desired to develop a method for producing microcapsules well adapted for various technical fields, in which various coats can be formed on various cores at any desired but uniformly controlled coat thickness.

SUMMARY OF THE INVENTION

One object of this invention is, therefore, to provide a method of preparing microcapsules in which various coats can be formed on various cores at any desired but uniformly controlled coat thickness.

Another object of this invention is to provide a microcapsule which is applied all over the surface with a coat so continuous that it is much more improved in terms of strength and durability.

According to this invention, the first object is achieved by the provision of a method of preparing microcapsules comprising the following steps (a) to (e):

(a) providing microcapsule cores;
(b) depositing resin particles uniformly onto the surfaces of said microcapsule cores to form resin particle-deposited-onto-cores,
(c) putting said resin particle-deposited-onto-cores into a monodisperse state,
(d) bringing said resin particle-deposited-onto-cores in a monodisperse state into contact with a solvent in which the resin of said resin particles can dissolve, and
(e) drying said resin particle-deposited-onto-cores which has been brought into contact with the solvent, while kept in the monodisperse state and, then, recovering the dried cores.

BRIEF DESCRIPTION OF THE DRAWINGS

The present invention will be explained in greater detail with reference to the accompanying drawings, in which.

DETAILED DESCRIPTION OF THE INVENTION

Figure 1:
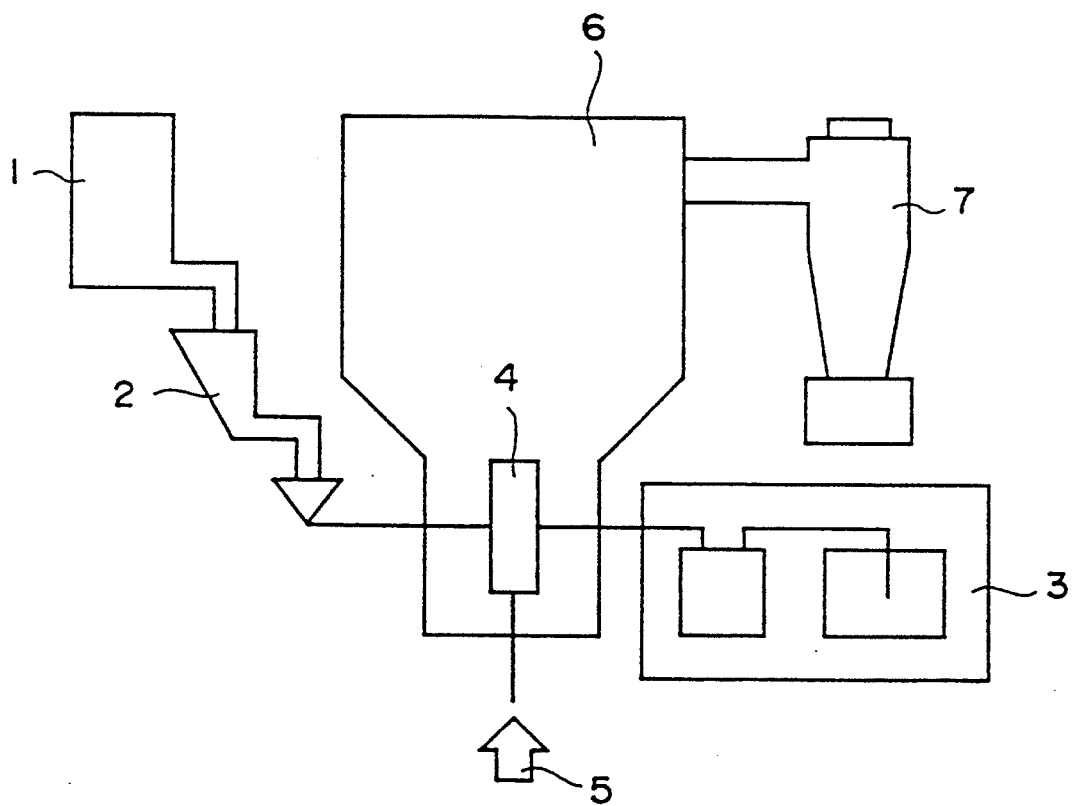
FIG. 1 is a schematic view showing equipment preferred for carrying out the method of preparing microcapsules according to this invention.

As described just above, the method of preparing microcapsules according to this invention comprises the steps (a) to (e).

Step (a)

The method according to this invention is applicable not only to solid microcapsule cores but also to liquid microcapsule cores. According to this invention, it is thus possible to microcapsulize many types of materials that may be used as cores in methods now available in the art, such as toners, pharmaceuticals, liquid crystals, adhesives, coating materials, printing ink, cosmetics, perfumes and agricultural chemicals. According to the method for producing microcapsules of this invention wherein neither large amounts of heat nor high pressures are needed to deposit and fix coats onto the cores' surfaces, as will be hereinafter described, limitations on what form and state the microcapsule cores assume are greatly eased. It is thus possible to microcapsulize even materials which were once considered practically impossible to microcapsulize by conventional techniques.

Step (b)

At this step, resin particles are deposited uniformly onto the surfaces of the microcapsule cores provided at the first step to form resin particle-deposited-onto-cores.

No limitation is imposed on techniques to achieve deposition of the resin particles at this step, if they enable the resin particles to be deposited uniformly onto the surfaces of the microcapsule cores and make their deposition and the number of resin-particle layers formed controllable. According to the method of this invention, the deposited resin particles are formed into a uniform coat when brought into contact with a solvent at Step (d), as hereinafter described. The thickness of the coat is proportional to the amount of the resin particles deposited. Uniform deposition of a single coat of the resin particles onto the cores' surfaces is particularly preferred, because the thickness of the coat is controllable by controlling the particle size or diameter of the resin.

Deposition of the resin particles may be achieved by either dry processes wherein they are deposited in a dry state or wet processes wherein they are deposited in a solvent.

The dry processes may be carried out with ordinary mixers (e.g. ball mills or V-type mixers), or alternatively in mechanochemical reaction manners (using, e.g. a high speed flow type of stirrer) or powdered or fluidized bed manners. Particular preference is given to the mechanochemical reaction type of process making use of a high speed flow type of stirrer, because the number of resin particle layers deposited can be controlled easily. Typical of the high speed flow type of stirrer are a so-called Henschel mixer, Mechanofusion System (made by Hosokawa Micron K.K.), Nara Hybridization System (Nara Kikai Seisakusho K.K.) and Mechanomill (Okada Seiko K.K.).

The wet processes, for instance, may include a wet milling one wherein a dispersion solvent with cores being dispersed with resin particles in it is milled by a ball mill; a hetero-coagulation one which makes use of an electrostatic attraction force produced through a zeta potential difference between the surfaces of cores and the surfaces of resin particles; and a coupling agent one wherein resin particles are combined with the surfaces of cores by way of a coupling agent.

In this connection, the "hetero-coagulation" process is understood to refer to one set forth in "J. Colloid and Interface Science", 109, pp. 69-78 (1988), in which cores and resin particles are dispersed in water with zeta potentials of different signs. Then, the resulting two dispersions are mixed together, whereby the resin particles having a smaller particle diameter are electrostatically, deposited onto the surfaces of the cores having a larger particle diameter to form resin particle-deposited-onto-inner cores. This process, in which no external force is needed for the deposition of resin particles onto cores, is more advantageous in that the resin particles can be deposited onto the cores made of a material so soft that difficulty can be encountered in handling it by dry processes. It is thus possible to use as the microcapsule cores powders made of soft materials such as wax, rubber or elastomer, or droplets of hydrophobic liquids dispersed in water. According to the coupling process, on the other hand, resin particles are deposited onto cores by having allowed a coupler to be added to the cores, optionally treated on its surface, while having permitted the resin particles to contain a functional group reactive with the functional group of the coupling agent.

Step (c)

At this step, the resin particle-deposited-onto-cores obtained at Step (b) are put into a state where they do not physically contact each other, namely, a monodisperse state. Usable to this end is any process enabling the resin particle-deposited-onto-cores to exist in a state where they do not contact each other. For instance, use may be made of processes wherein they are carried with a gas stream or dispersed in liquid.

Step (d)

At this step, the resin particle-deposited-onto-cores put in the monodisperse state at Step (c) is brought into contact with a solvent in which the resin of the resin particles can dissolve. In the present disclosure, the solvent in which the resin of the resin particles can dissolve is used to mean that after contacting the resin particles, the solvent evaporates off, leaving a uniform resin coat on the surface of the toner's core. The solvents used in this invention may be optionally chosen depending upon the particle-forming resin used, the solubility of the resin in them and the manner and time of contact.

No limitation is placed on how to bring the resin particle-deposited-onto-cores into contact with the solvent, if uniform contact of the inner cores with the solvent is well achieved. However, preference is given to processes enabling the time of contact to be controlled. More illustratively, mention is made of processes in which the solvent is sprayed into a space where the resin particle-deposited-onto-cores carried with gas stream are in the monodisperse state; they are dispersed in the solvent; they are dispersed in a preliminary solvent incapable of dissolving the particle-forming resin in it and the solvent is sprayed into a space into which the resulting dispersion is sprayed; they are caused to impinge upon or pass through a wall of the solvent jetted in the form of a curtain; they are caused to impinge on or mix with the solvent jetted in the form of a liquid column; and they are caused to impinge upon a thin layer of the solvent cast on a support. The process of spraying the solvent onto the resin particle-deposited-onto-cores carried with a gas stream and put in the monodisperse state is particularly preferred for combinations of rapidly dissolving resin particles with solvents or for dissolving resin particles having a minute particle size, because the time of contact of the resin particle-deposited-onto-cores with the solvent can be reduced to a maximum. Preference is also given to the process of dispersing the resin particle-deposited-onto-cores in the solvent, because it may be carried out simultaneously with Step (c) at which said cores have been put in the monodisperse state. In addition, the process, wherein the resin particle-deposited-onto-cores are first dispersed in the preliminary solvent incapable of dissolving the resin of resin particles in it and the solvent is then sprayed into a space into which the resulting dispersion has been sprayed, is preferably applicable to a resin particle/core system in which the resin particles are less adhesive to the cores that the former are likely to peel off the latter while carrying the former with a gas stream to put them in the monodisperse state.

Units preferred for carrying out this step, for instance, include those with such nozzles as hereinafter described, known spray dryers, Coatmizer (made by Furointo Sangyo K.K.) and Dispercoat (Nisshin Engineering K.K.)

Step (e)

In the resin particle-deposited-onto-cores brought into contact with the solvent at Step (d), the resin particles on their surfaces are deposited onto them in a state where he resin particles dissolve in the solvent. This step is provided to evaporate off such a solvent from the resin particles, leaving uniform resin coats on the cores' surfaces. In order to prevent coagulation of the particles, it is then an inevitable requirement to evaporate off the solvent while hey remain in the monodisperse state. By way of example, the resin particle-deposited-onto-cores, which have been carried with a gas stream to put them in the monodisperse state and then brought into contact with the solvent, may be further carried with a gas stream for a certain period of time. If required, they may be carried with a heated gas. Alternatively, the dispersion obtained by the dispersion of the resin particle-deposited-onto-cores at Step (d) may be sprayed for the evaporation of the solvent, or may be subjected to filtration drying in which that dispersion is filtrated and then dried.

The thus dried particles are thereafter recovered in the form of microcapsules. Recovery may be achieved by known particle recovery processes and equipment, e.g. a cyclone.

Microcapsule Production Equipment

FIG. 1 is a schematic view of an arrangement preferable for carrying out the method of preparing microcapsule according to this invention. Referring to FIG. 1, there is illustrated a powder mixer unit 1 for depositing resin particles onto the surfaces of microcapsule cores. The resin particle-deposited-onto-core obtained in the unit 1 is fed to a mixer unit 4 through a powder feeder unit 2. A solvent, on the other hand, is supplied to the mixer 4 through a solvent feeder unit 3, to which mixer 4 a carrier gas is also fed by way of 5.

Figure 2A:
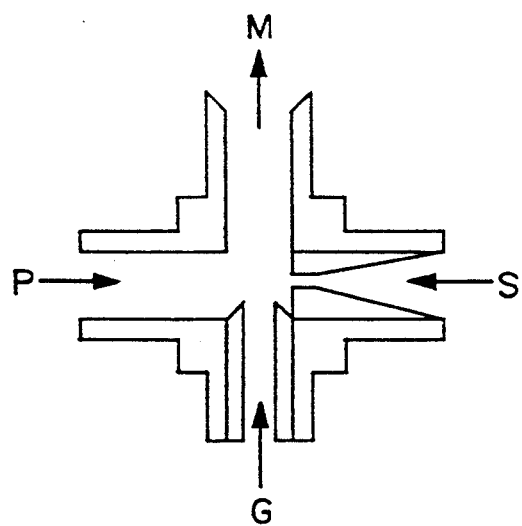
FIGS. 2(a)–(d) are views illustrative of equipment for mixing together the particle resin-deposited-onto-cores, solvent and gas.
Figure 2B:
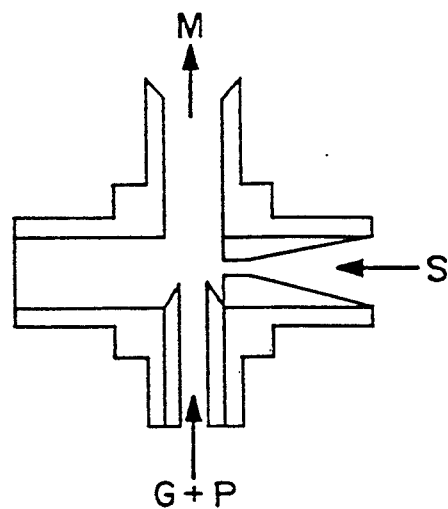
Figure 2C:
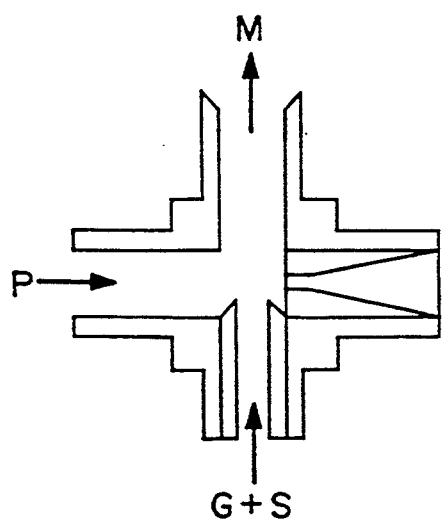
Figure 2D:
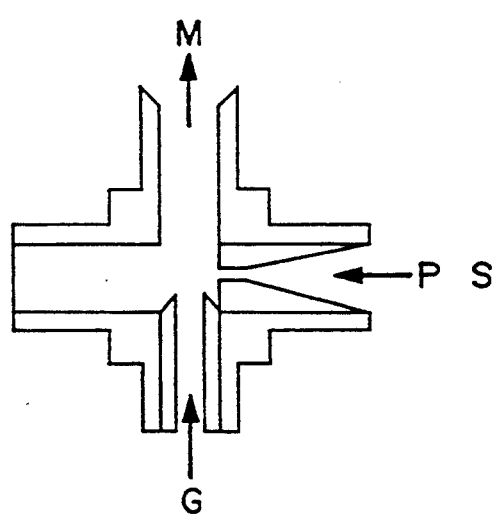
Figure 3A:
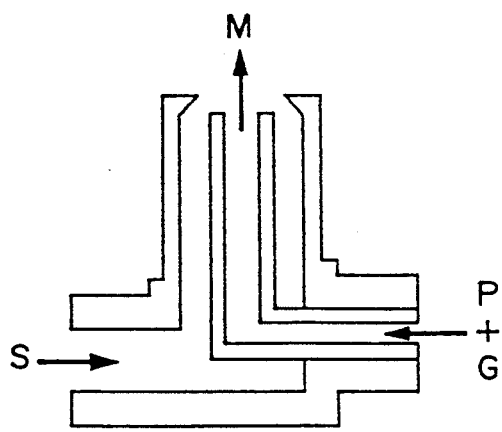
FIGS. 3(a)–(d) are views illustrative of other equipment for mixing together the particle resin-deposited-onto-cores, solvent and gas.
Figure 3B:
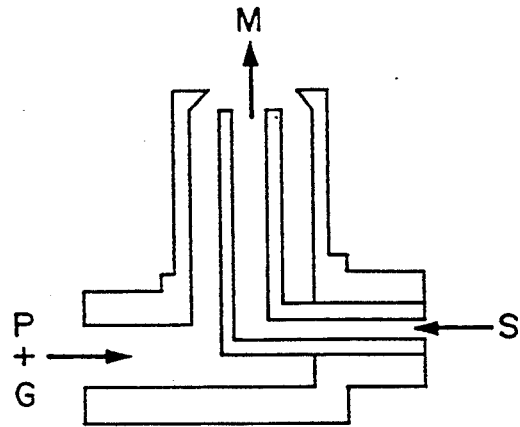
Figure 3C:
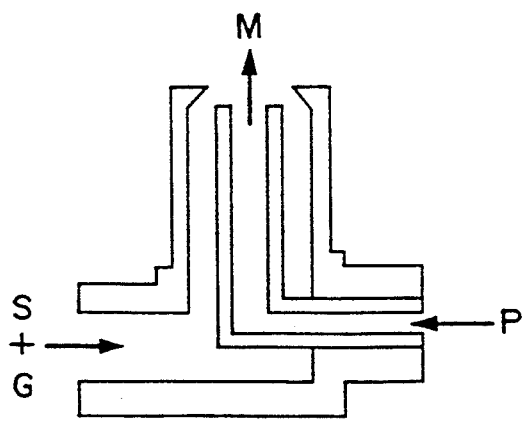
Figure 3D:
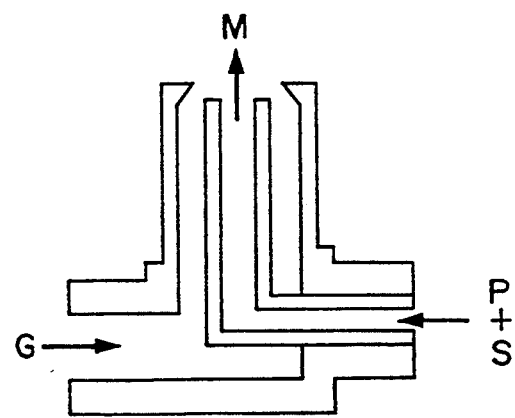

The mixer 4 is provided to perform Step (c) and (d) as well as Step (e) for drying. Typical examples of the mixer 4 are depicted in FIGS. 2 and 3, wherein P represents resin particle-deposited-onto-core, S a solvent, G a carrier gas and M a mixture of these three ingredients. The mixer depicted in FIG. 1 is a so-called nozzle including three inlets and a discharge outlet through which the mixture M is to be jetted. As illustrated in FIG. 2(a), the three ingredients P, S and G may be separately supplied through the associated respective inlets. Alternatively, two of the three ingredients may be mixed together in advance for supply, as depicted in FIGS. 2(b) to (d). According to any one of the nozzle units shown in FIG. 2, the three ingredients are mixed together inside it. FIGS. 3(a) to (d) show nozzle units similar to those depicted in FIG. 2, but each includes on discharge outlet surrounded with another discharge outlet in spaced relation. The ingredients jetted out of these two outlets are to be mixed together on lines extending from them. According to any one of the nozzle units shown in FIG. 3, two of the three ingredients P, S and G are previously mixed together and will then be supplied to the associated inlets leading to the two outlets. Finally, they will be mixed together on the outside of the nozzle.

The resin particle-deposited-onto-cores brought into contact with the solvent in the mixer 4 is carried with the gas through the nozzle's outlet or outlets into a certain space or, in other words, a dryer unit 6. While carried with the gas, the solvent evaporates off, leaving a uniform resin coat on the core's surface.

The thus produced microcapsules are recovered through a recovery unit 7.

Preparation of Multilayered Toners

How to prepare multilayered toners with the method according to this invention will now be explained.

Figure 4:
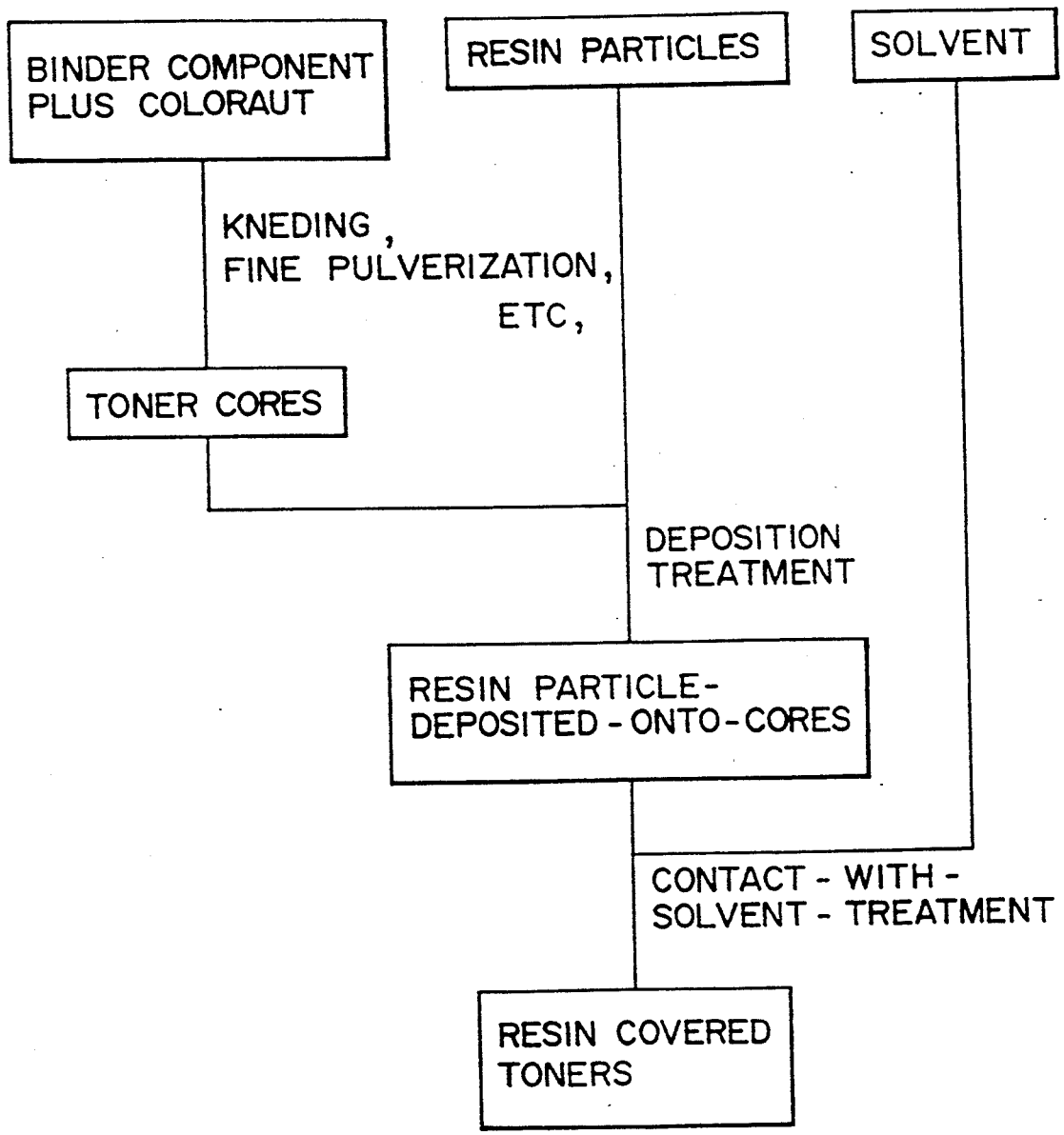
FIG. 4 is a chart depicting the steps for dry producing toners.
Figure 5:
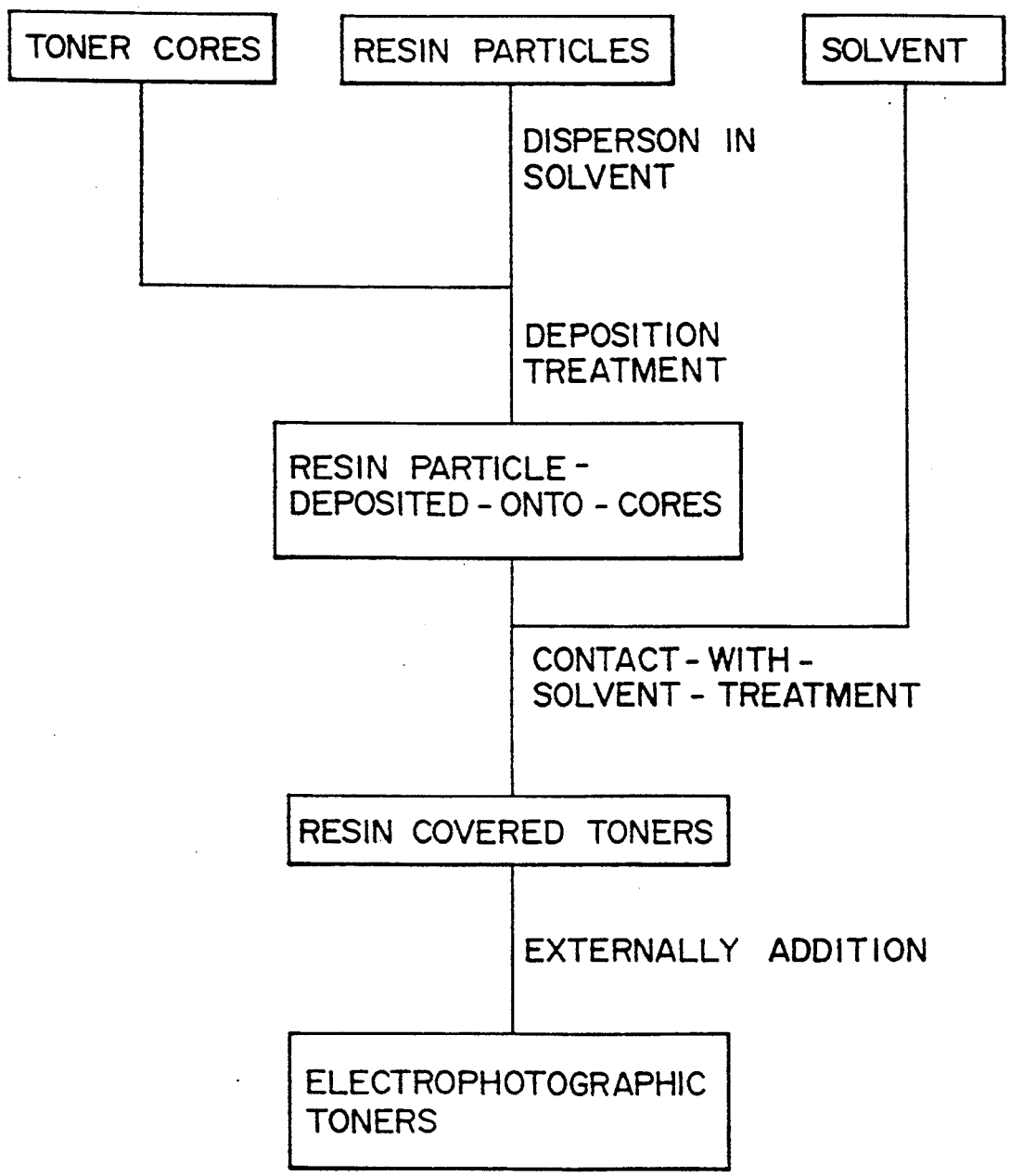
FIG. 5 is a chart depicting the steps for wet producing toners.

FIG. 4 illustrates a scheme for dry producing toners, while FIG. 5 shows a scheme for wet producing toners.

How to dry produce toners will first be explained with reference to FIG. 4. Toner cores corresponding to microcapsule toners are first provided. This toner cores may each be made up of a conventional multilayered one. For instance, it may be composed of a binder ingredient, a coloring agent and other toner components such as electrification controllers, magnetic powders, electrically conductive matter, fluidity improvers, releasants and dispersants. The toner core may be prepared from these raw materials in conventional manners. For instance, it may be obtained by mixing and finely pulverizing such raw material. Alternatively, it may be obtained by other suitable means such as spray drying and polymerization.

The particle size of the toner core, which may be suitably determined in consideration of the conditions under which it is to be used, lies generally and preferably in the range of 1 to 40 $\mu$m.

The binder component of the toner core should preferably be made up of resins. Usable as the binder resins, for instance, are polystyrene and copolymers, e.g. hydrogenated styrene resins, styrene/isobutylene copolymers, ABS resins, ASA resins, AS resins, AAS resins, ACS resins, AES resins, styrene/p-chlorostyrene copolymers, styrene/propylene copolymers, styrene/butadiene crosslinked polymers, styrene/butadiene/chlorinated paraffin copolymers, styrene/allylalcohol copolymers, styrene/butadiene rubber emulsions, styrene/maleate copolymers and styrene/maleic anhydride copolymers; (meth)acrylic resins and their copolymers as well as styrene/acrylic resins and their copolymers, e.g. styrene/acrylic copolymers, styrene/dimethylaminoethyl methacrylate copolymers, styrene/butadiene/acrylate copolymers, styrene/methacrylate copolymers, styrene/n-butyl methacrylate copolymers, styrene/diethylaminoethyl methacrylate copolymers, styrene/methyl methacrylate/n-butyl acrylate copolymers, styrene/methyl methacrylate/butyl acrylate/N-(ethoxymethyl) acrylamide copolymers, styrene/glycidyl methacrylate copolymers, styrene/butadiene /dimethylaminoethyl methacrylate copolymers, styrene/acrylate/maleate copolymers, styrene/methyl methacrylate/2-ethylhexyl acrylate copolymers, styrene/n-butyl acrylate/ethyl glycol methacrylate copolymers, styrene/n-butyl methacrylate/acrylic acid copolymers, styrene/n-butyl methacrylate/maleic anhydride copolymer and styrene/butyl acrylate/isobutyl maleic half ester/divinylbenzene copolymers; polyester and its copolymers; polyethylene and its copolymers; epoxy resin; silicone resins; polypropylene and its copolymers; fluorocarbon resins; polyamide resins; polyvinyl alcohol resins; polyurethane resins; and polyvinyl butyral resin. It is noted that these resins may be used alone or blended together in combination of two or more.

Besides the aforesaid resins, waxes, etc. may be used as the binder components. For instance, use may be made of a plant type of naturally occurring waxes such as candelilla wax, carnauba wax and rice wax; an animal type of naturally occurring waxes such as beeswax and lanolin; a mineral type of naturally occurring waxes such as montan wax and ozokelite; a petroleum type of naturally occurring waxes such as paraffin wax, microcrystalline wax and petrolatum wax; synthetic hydrocarbon waxes such as polyethylene wax and Fischer-Tropsch wax; modified waxes such as derivatives of montan wax and paraffin wax; hydrogenated waxes such as hardened castor oil and its hydrogenated derivatives; synthetic waxes; higher fatty acids such as stearic and palmitic acids; polyolefins such as low-molecular-weight polyethylene, polyethylene oxide and polypropylene; and olefinc copolymers such as ethylene/acrylic acid copolymers and ethylene/acrylate copolymers and ethylene/vinyl acetate copolymers. These waxes may be used alone or in combination of two or more.

As the coloring matter use may be made of black dyes and pigments such as carbon black, spirit black and nigrosine. For coloring purposes use may be made of dyes or pigments such as phthalocyanine Rhodamine B Lake, Solar Pure Yellow 8G, quinacridone, Tungsten blue, Indunthrene blue, sulfone amide derivatives and so on. As the dispersants use may be made of metallic soap, polyethylene glycol, etc., and electron-accepting organic complexes, chlorinated polyester nitrohumin acid, quaternary ammonium salts, pyridinium salts and so on may be added as the electrification controllers. Besides, magnetic powders for magnetic toners such as $Fe_3O_4$, $Fe_2O_3$, Fe, Cr and Ni, all in powdery forms, may be used.

The resin particles used for deposition onto the surfaces of the toner cores may be made of any material capable of dissolving in a solvent, with which they will be treated later. It is thus possible to use resin particles made of any material capable of imparting the desired properties to the resulting toners. Resins so far used as the toner component of toner cores may also be employed without restriction, if they are dissolvable in the solvent used. If desired, use may be made as well of resin particles composed of water-isoluble resins such as polyols inclusive of polyvinyl alcohol, polyallyl alcohol, polybenzyl alcohol and polyhydroxyethyl methacrylate; polyamines inclusive of polyvinyl pyrrolidone, polyvinyl pyridine, polyvinylamine and polyallylamine; acrylic derivatives inclusive of polyacrylamide, polyacrylic acid and polymethacrylic acid; naturally occurring high molecules such as polylactic acid, casein, hydroxypropylcellulose, methylcellulose, carboxymethylcellulose, gelatin, starch, gum arabic, polyglutamic acid and polasparaginic acid.

Determining the thickness of the resulting coat, as so far mentioned, the particle size of the resin particle should be determined with that in mind. For instance, a preferable particle size lies in the range of about 0.05 μm to about 15 μm.

The resin particle may contact an additional or third component for the purpose of improving the properties of toners. Alternatively, such a third component may be deposited as separate particles onto the toner cores simultaneous with the resin particles. The third component used may be $SiO_2$, $TiO_2$, (rutile and anatase), ZnO, $Al_2O_3$ of the α- or β-type), TiON, $TiBaO_3$, MgO, $ZrO_2$, $CaCO_3$, NiO, SnO, clay, talc, silica sand, mica, SiN, SiC, $Ba_2SO_4$, carbon black or the like, all in finely divided forms. These are added so as to improve the powder properties, esp. fluidity, electrofiability, moistureproofness and storage stability of toners.

The solvents used may be suitaly chosen depending upon the type of resin forming the aforesaid resin particles. Either aqueous or organic solvents may be employed. How the resin particles are combined with the solvents may be determined using as an index a solubility parameter, by way of example. In a table given just below, preferable materials, of which the resin particles are made, are set out together with the range of the solubility parameter of preferable solvents.

In this connection, it is noted that the hydrogen bond force of solvents is classified according to what is set forth in N. M. Bikales, "Encyclopedia of Polymer Science and Technology", Vol. 12, pp. 600-625, Wiley, 1970. Illustrative examples of these solvents are given below, with their solubility parameter bracketed.

Solvents with a weak hydrogen bond force include hydrocarbons such as n-hexane (7.42) heptane (7.24) and cyclohexane (8.18); aromatic hydrocarbons such as benzene (9.15), toluene (8.91) and xylenes (8.8-9.0); halogenated hydrocarbons such as dichloromethane (9.88), chloroform (9.24), tetrachloromethane (8.58), dichloroethane (9.91) and chlorobenzene (9.51), and so on.

Solvents with a medium hydrogen bond force include nitrogen compounds such as nitromethane (12.7), acetonitrile (11.8) and acrylonitrile (10.5); ethers such as tetrahydrofuran (9.32), dioxan (9.73) and methyl cellosolve (10.8); esters such as ethyl acetate (9.04) and butyl acetate (8.5); ketones such as acetone (9.71), methyl ethyl ketone (9.04) and cyclohexanone (9.26); and so on.

Solvents with a strong hydrogen bond force include alcohols such as methanol (14.5), ethanol (12.9), propanol (11.9) and benzyl alcohol (12.1); nitrogen compounds such as pyridine (10.7), diethylformamide (10.6), dimethylformamide (12.1); and so on.

Solubility parameter of solvents

| Resins | Solubility parameter of solvents | | |
|---|---|---|---|
| | Hydrogen bond force | | |
| | Weak | Medium | Strong |
| Vinyl resins (styrenes and acrylics) | 8.9-12.7 | 7.4-13.3 | 9.5-14.5 |
| Polyester resins | 8.9-11.6 | 9.3-11.1 | unpreferred |
| Epoxy resins | 8.5-12.7 | 7.4-14.7 | 9.5-14.5 |
| Silicone resins | 7.0-9.5 | 7.4-10.8 | 9.5-11.4 |
| Fluorocarbon resins | unpreferred | 7.4-10.3 | 9.2-14.5 |
| Polyamide resins | 8.5-11.1 | 7.4-12.1 | 8.9-12.7 |
| Polyurethane resins | 8.5-10.3 | 7.4-12.4 | 9.3-12.0 |
| Water-soluble resins | unpreferred | unpreferred | 9.0-24.5 |

These solvents may be used in the form of a mixture with another class of solvents. For instance, when it is desired to increase the length of time of contact of the resin particles with the solvent, a solvent in which they are not dissolved may be added, thereby increasing the length of time of that contact.

Then, the resin particle-deposited-onto-cores obtained in this manner are brought into contact with the aforesaid solvent. For this purpose such equipment as so far explained may be used. In particular, the nozzle units shown in FIG. 2 or 3 are preferably used. With these units, the length of time of contact of the resin particles with the solvent should preferably lie in the range of about $10^{-5}$ sec. to about 10 sec., more particularly about $10^{-4}$ sec. to about 5 sec. Following contact, the particles are dried, preferably by carrying them with a gas stream. The temperature of the carrier gas should lie in the range of preferably about 0° C. to about 150° C., more preferably about 20° C. to about 100° C., and drying by the carrier gas has to be finished preferably within about 10 sec. to about 120 sec., more preferably within about 20 sec. or shorter.

How to wet produce toners will then be explained with reference to FIG. 5.

The resin particles are first dispersed in a solvent in which they are not dissolved. Illustrative examples of the solvent used to this end are petroleum type solvents such as hexane, heptane, Isopar (Toray Industries, Inc.) and kerosene, water or the like. In order to improve the dispersibility of the resin particles, it is also possible to add to them surface active agents, whether they are anionic, cationic or nonionic; polycarboxylates such as derivatives of polyacrylate and polymethacrylate and copolymers of maleic anhydride; sol sparse type ultra-dispersants; or the like. Resin particles prepared by polymerization may also be used in the form of a dispersion, if the resulting resin particle dispersion is rid of emulsifiers, stabilizers, polymerization initiators, etc. as by dialysis.

The thus obtained resin particle dispersion is then mixed with toner cores so as to deposit the resin particles onto them. In this case, the toner cores may be either in a powdery form or in a dispersion state in the presence of a solvent. Deposition may be achieved by any one of such wet processes as so far explained. However, preference is given to the wet milling, coupling or hetero-coagulation process. When relying upon the wet milling process, the particle size ratio between the toner cores and the resin particles hould preferably be equal to or higher than 5. In the case of the coupling agent process, not only is that ratio equal to or higher than 3, but it is also required that the toner cores contain, or be treated on their surfaces with, coupling agents such as silane, titanium, chromium, aluminium, organic phosphorus and silyl peroxide, while the resin particles used include groups capable of reacting with the functional groups of the coupling agents, e.g. amino, aldehyde, ester, epoxy, carboxy, chloromethyl, acid amide, hydroxyl, thiol or like group. With the heterocoagulation process, that ratio should preferably be equal to or higher than 3. Also preferably, composition control should be performed in such way that the zeta potentials of the cores 1 and resin particles 11 are opposite in polarity to each other.

The thus obtained resin particle-deposited-onto-cores may be brought into contact with the solvent immediately or after separation from the dispersion.

The thus obtained resin particle-deposited-onto-cores are then allowed to come into contact with the solvent. In the case of a solvent system in which they dissolve at a slow rate, contact sould preferably be carried out by subjecting a dispersion of them dispersed in the solvent to filtration drying or spray drying. In other systems, contact should be performed making use of such nozzle units as so far described and illustrated. The time of contact and the conditions for subsequent drying are basically similar to those set forth in connection with the aforesaid dry processes.

It is understood that the multilayered toners obtained by the dry or wet processes may be used as such in the form of toners. If required, they may be further treated on their surfaces with such additives as electrification controllers and fluidity improvers, thereby preparing electrophotographic toners.

The present invention will now be explained more illustratively with reference to the following examples.

EXAMPLE 1

| Styrene/acrylic copolymer | 97% by weight |
|---|---|
| Metal-containing azo dye | 1 |
| Carbon black | 2 |

The aforesaid feeds were kneaded together with a twin-screw extruder and crushed after cooling. Then, the crushed product was finely pulverized with a jet pulverizer and classified to obtain core particles with a mean particle size of 10 $\mu$m and a distribution of 5-25 $\mu$m.

As fine resin particles use was made of polybutyl methacrylate (PBMA) having a particle size of 0.2 $\mu$m and a glass transition temperature of 83° C. The core particles and fine particles were mixed together at a weight ratio of 20 to 80. The mixture was subsequently treated with a mechanofusion system (made by Hosokawa Micron K.K.) at 1500 r.p.m. for 30 minutes to deposit the fine particles onto the toner cores.

An excessive amount of the fine PBMA particles playing no role in deposition was classified out. It is here understood that the removal of the excessive PBMA particles by the classifier may be omitted by regulating the amount of the starting PBMA particles fed in. Electron-microscopical observation of the cores' surfaces indicated that even after removal, the PBMA particles were deposited onto them without showing any sign of peeling. Another electron-microscopic observation of the cores' sections indicated that the PBMA particles are embedded beneath their surfaces while taking spherical forms.

The thus obtained resin paricle-deposited-onto-cores are brought into contact with solvent acetone, as described just below. The nozzle unit shown in FIG. 2(a) is used for this purpose.

First, the resin particle-deposited-onto-cores are fed into the nozzle, in which they are attracted inwardly by an ejector effect generated by a carrier gas flowing at high speed therethrough. By contacting a high speed stream of the carrier gas, the resin particle-deposited-onto-cores are put in the monodisperse state and dispersed in that stream. The solent acetone, on the other hand, is supplied into the nozzle from its position opposite to the cores. However, the acetone makes no way through the high speed stream of the carrier gas, so that it is most likely to contact the cores before they have not been put in the monodisperse state. Thus the acetone is allowed to contact the resin particle-deposited-onto-cores put in the monodisperse state in the carrier gas stream. Upon contacting the acetone, the cores are delivered through the nozzle, while they are dispersed in the carrier gas in the monodisperse state. At this time, the resin particles on the cores dissolve in the acetone, forming a PMBA/acetone resin solution layer on the cores' surfaces. Subsequently, a mixture comprising the cores, acetone and carrier gas is transferred through the nozzle to the drying step. By the time of contact of the cores with the acetone is herein meant a length of time between the time at which the three feeds or cores, acetone and carrier gas have been supplied into the nozzle and the time at which they have been discharged through the nozzle. In the instant example, that length of time is 0.1 second or shorter. In drying equipment, a hot air of 60° C. permits the acetone to evaporate off the PMBA/acetone resin solution layers on the cores' surfaces, leaving PMBA resin coats thereon. In addition, the particles are spaced away from each other while they are discharged through the nozzle to the drying unit, so that no coagulation of them takes place at all. Afterwards, the particles are supplied to a cyclone where they are recovered as toners.

The thus obtained toner particles were in a nonintegrated or, in better term, discrete state. Electron-microscopic examination along the sections of the particles obtained in the instant example revealed that 0.1-μm thick PBMA resin coats were formed on the cores' surfaces. After a surface treatment of the thus prepared toners with a fluidity improver, an image was made with a laser printer including a one-component noncontact type of developer and an OPC photographic material. This image was clear-cut and blocking- or caking-free.

EXAMPLE 2

Similar core particles as used in Example 1 were used, and the thickness of coat was controlled by varying the particle sizes of fine particles to be deposited onto the cores. Used for the fine resin particles were PBMA with a particle size of 0.4 μm, PMMA with a particle size of 0.8 μm and PMMA with a particle size of 1.0 μm. The conditions for the deposition of the fine particles are set out in Table 1. Then, the particles were brought into contact with a solvent in similar manners as described in Examle 1. Likewise, the obtained particles were examined on their surfaces and along their sections to determine the coats' thickness. The conditions for contact and the results are set out in Table 2. Thus coats having any desired thickness can be formed by varying the particle size of the particles to be deposited onto the cores' surfaces.

TABLE 1

| Particle size μm | Amount of fine particle feed, wt. % | Number of mechano-revolutions, r.p.m. |
|---|---|---|
| 0.5 | 25 | 1700 |
| 0.8 | 30 | 1900 |
| 1.0 | 35 | 2100 |

The test runs were all performed for 30 minutes.

TABLE 2

| Particle size μm | Time of contact SEC | Drying temp. °C. | Thickness μm |
|---|---|---|---|
| 0.4 | 0.5 | 60 | 0.2 |
| 0.8 | 1.0 | 60 | 0.4 |
| 1.0 | 2.0 | 60 | 0.5 |

Acetone was used as the solvent.

EXAMPLE 3

In the instant example, core particles composed mainly of waxes were used together with magnetic powders and colorant-containing particles.

| Paraffin wax | 30% by weight |
|---|---|
| Polyethylene wax | 30 |
| $Fe_3O_4$ | 38 |
| Carbon black | 2 |

The aforesaid feeds were kneaded together with a batch type of kneader and crushed after cooling. Then, the crushed products was finely pulverized with a jet pulverizer and classified to prepare core particles with a mean particle size of 10 μm and a distribution of 5–25 μm.

Similar fine PBMA particles as used in Example 1 were deposited onto the toner cores' surfaces under similar mixing conditions. Because the core particles were soft, however, the mixing treatment was continued at 800 r.p.m. over 15 minutes. An excessive amount of the fine PBMA particles playing no role in deposition was classified out. It is here understood that the removal of the excessive PBMA particles by the classifier may be omitted by regulating the amount of the starting PBMA particles fed in. Electron-microscopical observation of the cores' surfaces indicated that even after removal, the PBMA particles were deposited onto them without showing any sign of peeling. Another electron-microscopic observation of the cores' sections indicated that the PBMA particles are embedded beneath their surfaces while taking spherical form.

The thus obtained resin particle-deposited-onto-cores were brought into contact wih a solvent xylene, using a Dispercoat (made by Nisshin Flour Minning Co., Ltd.). The time of contact was 0.5 seconds. Subsequent drying was carried out by spray drying at a temperature of 60° C. As was the case with Example 1, the obtained particles were in a nonintegrated or discrete state. Electron-microscopic examination along the particles' sections revealed that 0.1-μm thick PBMA resin coats were formed on the cores' surfaces. After a surface treatment of the thus prepared toners with a fluidity improver, an image was made with a laser printer including a one-component noncontact type of developer and an OPC photographic material. The image, obtained at a fixing temperature of as low as 120° C., was found to be clear-cut and blocking- or caking-free.

EXAMPLE 4

Similar core particles as used in Example 3 were used, and the thickness of coats was controlled by altering the particle sizes of the fine resin particles to be deposited onto the core particles.

TABLE 3

| Particle size μm | Amount of fine particle feed, wt. % | Number of mechano-revolutions, r.p.m. |
|---|---|---|
| 0.5 | 25 | 800 |
| 0.8 | 30 | 900 |
| 1.0 | 35 | 1000 |

The test runs were all performed for 15 minutes.

In similar manners as described in Example 1, the resin particle-deposited-onto-core were then brought into contact with a solvent. However, xylene was used as the solvent. In consequence, the same results as set out concerning Example 2 in Table 2 could again be obtained. This implies that even when relatively soft particles composed mainly of waxes are used as the core particles, coats having any desired thickness can be obtained by altering the particle sizes of the fine particles for surface deposition.

EXAMPLE 5

Use was made of particles obtained by depositing $SiO_2$ onto similar core particles as used in Example 3 and sphering them with a hot air process. Used for the deposition of $SiO_2$ was a mechanofusion system (made by Hosokawa Micron K.K.). $SiO_2$ accounted for 5% by weight of 95% by weight of the core particles.

The above-mentioned particulate feed was set in the mechanofusion equipment to treat it at 800 r.p.m. for 15 minutes to obtain powders. Then, the thus $SiO_2$-deposited-onto-core particles were sphered by spraying the powders into a hot air stream under the following conditions:

Hot air temperature: 200° C.,
Amount of hot air: 100 l/min,
Powder feed rate: 200 g/hr., and
Amount of powder feeding air: 5 l/min.

Microscopic observation of the core particles treated by the aforesaid process indicated that each particle was in the form of a nearly true sphere and so well smoothened that it was irregularity-free. In similar manners as described in Example 3, fine resin particles were deposited onto the spherical core particles and then brought into contact with a solvent, thereby enabling such similar coats as mentioned in Example 3 to be formed. Imaging in similar manners as set forth in Example 3 again gave similar results.

EXAMPLE 6

| | |
|---|---|
| Binder resin - styrene-n-butyl methacrylate copolymer | 53 g |
| Colorant - channel black | 4 g |
| Magnetic powders - $Fe_3O_4$ | 40 g |
| Releasant - polypropylene wax | 3 g |

The foregoing feeds were mixed and kneaded together with a batch type of kneader, and was then finely pulverized into particles as fine as 10–15 $\mu$m by means of jet milling, thereby obtaining toner cores.

The whole amount of the toner cores was mixed with 500 ml of a methyl methacrylate/butyl methacrylate copolymer (having a particle size of 0.3 $\mu$m and in the form of a 5% aqueous dispersion) for wet milling deposition in a ball mill. Subsequent spray drying yielded resin particle-deposited-onto-toners.

While discharging the toners through a powder feed nozzle, 1000 ml of a solvent methyl ethyl ketone were spray misted onto them through a two-part fluid nozzle for dissolution and fixation, thereby preparing resin covered toners.

Further, 2 g of silicon oxide and 5 g of a metal-containing dye were externally added to the toners as a fluidizer and an electrification controller, respectively. Subsequent classification for removing undeposited matter gave electrophotographic toners, designated by A.

EXAMPLE 7

| | |
|---|---|
| Binder resin - styrene-n-butyl methacrylate copolymer | 51 g |
| Colorant - channel black | 4 g |
| Magnetic powders - $Fe_3O_4$ | 40 g |
| Releasant - polypropylene wax | 3 g |
| Coupling agent - an amine type of silane coupler | 2 g |

The foregoing feeds were mixed and kneaded together with a batch type of kneader, and was then finely pulverized into particles as fine as 10–15 $\mu$m by means of jet milling, thereby obtaining toner cores.

The whole amount of the toner cores was mixed with 500 ml of a methyl methacrylate/butyl methacrylate copolymer (having a particle size of 0.3 $\mu$m and in the form of a 5% aqueous dispersion), and the resultant mixture was further mixed together under agitation at 60° C. for 10 hours deposition by a coupling reaction. Subsequent spray drying yielded resin particle-deposited-onto-toners.

While discharging the toners through a powder feed nozzle, 1000 ml of a solvent methyl ethyl ketone were spray misted onto them through a two-part fluid nozzle for dissolution and fixation, thereby preparing resin covered toners.

Further, 2 g of silicon oxide were externally added to the toners as a fluidizer. Subsequent classification for removing undeposited matter gave electrophotographic toners, designated by B.

EXAMPLE 8

| | |
|---|---|
| Binder resin - | |
| styrene monomer | 20 g |
| n-butyl methacrylate monomer | 30 g |
| dimethylaminoethyl methacrylate monomer | 3 g |
| Colorant - channel black | 4 g |
| Magnetic powders - $Fe_3O_4$ | 40 g |
| Releasant - polypropylene wax | 3 g |
| Polymerization initiator - benzoyl peroxide | 40 mg |

The whole amount of the aforesaid feeds were mixed together to prepare a dispersion, which was in turn added to 3% of carboxymethylcellulose and 1 liter of an aqueous solution. The product was suspension polymerized to prepare toner cores, which were in turn dialized to obtain an aqueous solution in which the toner cores were dispersed. The whole amount of that aqueous solution was mixed with 2 liters of a 2% aqueous solution in which particles of a methyl methacrylate/butyl methacrylate/methacrylic acid copolymer obtained by emulsion polymerization (having a particle size of 0.3 $\mu$m) were dispersed. The mixture was then mixed under agitation for a further 24 hours for deposition by the hetero-coagulation process. Subsequently, spray drying and coat forming by the dissolution of the emulsifier were simultaneously performed to prepare resin coated toners.

Further, 2 g of silicon oxide were externally added to the toners as a fluidizer. Subsequent classification for removing undeposited matter gave electrophotographic toners, designated by C.

COMPARATIVE EXAMPLE 1

| | |
|---|---|
| Binder resin - styrene-n-butyl methacrylate copolymer | 53 g |
| Colorant - channel black | 4 g |
| Magnetic powders - $Fe_3O_4$ | 40 g |
| Releasant - polypropylene wax | 3 g |

The foregoing feeds were mixed and kneaded together with a batch type of kneader, and was then finely pulverized into particles as fine as 10–15 $\mu$m by means of jet milling, thereby obtaining toner cores.

The whole amount of the toner cores was mixed with 25 g of resin particles of a methyl methacrylate/butyl methacrylate copolymer having a particle size of 0.3 $\mu$m for mechanochemical deposition in a ball mill. Subsequently, 2 g of silicon oxide and 5 g of a metal-containing dye were externally added to the resin particle-deposited-onto-cores as a fluidizer and an electrification controller, respectively, followed by classification for removing undeposited matter. In this way, electrophotographic toners, designated by D, were obtained.

COMPARATIVE EXAMPLE 2

| | |
|---|---|
| Binder resin - | |
| styrene monomer | 22 g |
| n-butyl methacrylate monomer | 31 g |
| Colorant - channel black | 4 g |
| Magnetic powders - $Fe_3O_4$ | 40 g |
| Releasant - polypropylene wax | 3 g |

-continued

| Polymerization initiator - benzoyl peroxide | 40 mg |
|---|---|

The whole amount of the aforesaid feeds were mixed together to prepare a dispersion, which was in turn added to dispersion stabilizer and a 3% aqueous solution of carboxymethylcellulose/hydroxypropylcellulose serving as an encapsulating resin solution. The resulting solution was subjected to suspension polymerization and spray drying to prepare toner cores. Further, 2 g of silicon oxide were externally added to the toner cores as a fluidizer. Subsequent classification for removing undeposited matter gave electrophotographic toners, designated by E. The electrophotographic toners A–E were observed along their sections under a transmission type of electron microscope to determine the thickness of the coats. The results are shown in Table 4.

TABLE 4

| | Coat thickness, μm | |
|---|---|---|
| Toners | Averaged | The standard deviation |
| A | 0.15 | 0.052 |
| B | 0.16 | 0.031 |
| C | 0.15 | 0.035 |
| D | 0.21 | 0.107 |
| E | <0.01 | — |

It can be seen from Table 4 that Electrophotographic Toners A, B and C according to this invention are far less in coat thickness variation than comparative Electrophotographic Toner D, and are thus provided with uniform coats all over their surfaces. By contrast, Toner D had the resin particles deposited unevenly thereon and underwent serious variations in the coat thickness. Toner E had a coat thickness as thin as 0.01 μm or less or, to put it another way, was much thinner in the coat thickness than other toners.

Toners A–E were used with a one-component magnetic developer to measure the optical reflection density of imaged and non-imaged regions by printing an image on an imageable object before and after that developer had been driven and stirred for 15 hours. The results are shown in Table 5.

TABLE 5

| | Optical reflection density | |
|---|---|---|
| Toners | Imaged regions | Non-imaged regions |
| A before | 1.43 | <0.03 |
| after | 1.40 | 0.11 |
| B before | 1.42 | <0.03 |
| after | .1.44 | 0.05 |
| C before | 1.43 | <0.03 |
| after | 1.43 | 0.08 |
| D before | 1.43 | <0.03 |
| after | 1.07 | 0.09 |
| E before | 1.42 | <0.03 |
| after | 1.20 | 0.36 |

As can be understood from Table 5, Electrophotographic Toners A, B and C according to this invention are less in terms of variations in the optical reflection density and increases in stains on the non-imaged regions after the developer had been operated and stirred for 15 hours, and higher in terms of durability and stability, in comparison with Electrophotographic Toners D and E. By contrast, Toner D and E generated white toner-free white spots on the imaged regions due to development variations attributable to toner coagulation, decreasing the optical reflection density. Moreover, the non-imaged regions were stained by debris separated from the toners' surfaces by long stirring, increasing in the optical reflection density.

What is claimed is:

1. A method for producing microcapsules, comprising the steps of:
   (a) providing microcapsule cores having surfaces,
   (b) depositing resin particles uniformly onto the surfaces of said microcapsule cores to form resin particle-deposited-onto-cores,
   (c) putting said resin particle-deposited-onto-cores in a monodisperse state wherein they do not physically contact each other,
   (d) bringing said resin particle-deposited-onto-cores in the monodisperse state into contact with a solvent in which the resin of said resin particles can dissolve whereby to form a solvent-resin solution on the surfaces of the microcapsule cores, and
   (e) drying said resin particle-deposited-onto-cores which have been brought into contact with the solvent, while kept in the monodisperse state, whereby to form finished microcapsules having cores with continuous resin coats and, then, recovering the finished microcapsules.

2. A method as claimed in claim 1, wherein the deposition of said resin particles onto said cores at said step (b) is carried out by a mechanochemical reaction.

3. A method as claimed in claim 1, wherein the deposition of said resin particles onto said cores at said step (b) is carried out in a liquid.

4. A method as claimed in claim 1, wherein the monodisperse state at said step (c) is achieved by carrying said resin particle-deposited-onto-cores with a gas stream.

5. A method as claimed in claim 1, wherein the monodisperse state at said step (c) is achieved by carrying said resin particle-deposited-onto-cores in a liquid.

6. A method as claimed in claim 4, wherein the contact of said resin particle-deposited-onto-cores with said solvent at said step (d) is achieved by spraying said solvent into a space in which said resin particle-deposited-onto-cores are present in the monodisperse state.

7. A method as claimed in claim 1, wherein the contact of said resin particle-deposited-onto-cores with said solvent at said step (d) is achieved by dispersing said particle-deposited-onto-cores in said solvent.

8. A method as claimed in claim 6, wherein the drying at said step (e) is performed by further carrying said resin particle-deposited-onto-cores, which have been brought into contact with said solvent, with a gas stream.

9. A method as claimed in claim 7, wherein the drying at said step (e) is spray drying.

10. A method as claimed in claim 1, wherein said resin particles are deposited onto the surfaces of said cores at said step (b) in the form of a single layer.

11. A method as claimed in claim 1, wherein said microcapsule cores are toner cores containing at least a binder component.

12. A process as claimed in claim 1, wherein the method consists essentially of said steps a, b, c, d, and e.

* * * * *